United States Patent
O'Donoghue et al.

(10) Patent No.: US 12,159,409 B2
(45) Date of Patent: Dec. 3, 2024

(54) ENHANCED CALIBRATION OF IMAGING DEVICE OUTPUT

(71) Applicant: Optum Services (Ireland) Limited, Dublin (IE)

(72) Inventors: Kieran O'Donoghue, Dublin (IE); Mostafa Bayomi, Dublin (IE); Neill Michael Byrne, Dublin (IE); Michael J McCarthy, Dublin (IE); Ahmed Selim, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 241 days.

(21) Appl. No.: 17/660,151

(22) Filed: Apr. 21, 2022

(65) Prior Publication Data

US 2023/0342932 A1    Oct. 26, 2023

(51) Int. Cl.
    *G06T 7/80*    (2017.01)
    *G06T 7/00*    (2017.01)

(52) U.S. Cl.
    CPC .............. *G06T 7/0014* (2013.01); *G06T 7/80* (2017.01); *G06T 2207/10116* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,282,588 B2 | 5/2019 | Comaniciu et al. | |
| 11,083,913 B2 | 8/2021 | Lachaine et al. | |
| 11,748,598 B2 * | 9/2023 | Bai ...................... | A61B 6/584 382/131 |
| 2019/0026608 A1 * | 1/2019 | Hsieh ..................... | G06N 3/084 |
| 2020/0294508 A1 | 9/2020 | Kwasiborski et al. | |
| 2021/0117760 A1 | 4/2021 | Krishnan et al. | |
| 2021/0170103 A1 | 6/2021 | Gee et al. | |
| 2022/0309769 A1 * | 9/2022 | Cronin ................... | G06N 20/00 |
| 2022/0350996 A1 * | 11/2022 | Jonnalagedda ..... | G06F 18/2163 |

FOREIGN PATENT DOCUMENTS

WO    2021116036 A1    6/2021

OTHER PUBLICATIONS

Jiang, Wei, Yamn Chalich, and M. Jamal Deen. 2019. "Sensors for Positron Emission Tomography Applications" Sensors 19, No. 22: 5019. https://doi.org/10.3390/s19225019 visited Apr. 11, 2024 (Year: 2019).*

(Continued)

*Primary Examiner* — Sath V Perungavoor
*Assistant Examiner* — Paramita Ghosh
(74) *Attorney, Agent, or Firm* — Shumaker & Sieffert, P.A.

(57) ABSTRACT

A method comprises: obtaining a current initial image generated by an image generator of an imaging device based on current input signals of sensors of the imaging device; and applying a transformation model to the current initial image to generate a current transformed image, wherein the transformation model is a machine-learning model that has been trained to generate transformed images that more closely resemble reference images generated by a reference image generator.

20 Claims, 7 Drawing Sheets

(56) References Cited

OTHER PUBLICATIONS

Delua, Julianna. "Supervised vs. Unsupervised Learning: What's the Difference?" Mar. 12, 2021 https://www.ibm.com/blog/supervised-vs-unsupervised-learning/ visited Apr. 12, 2024 (Year: 2021).*

Philips product sheet, "Truly digital PET imaging" Advanced Molecular Imaging, VereosPET/CT, dated May 2016, found at https://philipsproductcontent.blob.core.windows.net/assets/20170523/ed2389b512114e209f2fa77c0145f267.pdf Visited on Apr. 14, 2024 (Year: 2016).*

Abayomi-Alli et al., "BiLSTM with Data Augmentation using Interpolation Methods to Improve Early Detection of Parkinson Disease", 15th Conference on Computer Science and Information Systems, vol. 21, IEEE, Sep. 6, 2020, pp. 371-380.

* cited by examiner

ENHANCED CALIBRATION OF IMAGING DEVICE OUTPUT

BACKGROUND

An imaging device may be used to generate one or more images based on ground truth data for observation by a human operator. For example, sensors of an x-ray device may generate one or more signals indicative of internal structures of a patient, and an image generator of the x-ray device may use the one or more signals to generate an image of the internal structures. A physician may examine the x-ray image to diagnose the patient.

SUMMARY

The present disclosure describes devices, systems, and methods for transforming output images of an imaging device to improve the output image accuracy. Ideally, each imaging device of a plurality of imaging devices should generate the same output image when analyzing the same ground truth data. The sensors of each imaging device may be calibrated to the particular environment experienced by the imaging device. Similarly, the image generator of each imaging device may have one or more calibration parameters to compensate for different environmental conditions and sensor sensitivities. However, small differences in the environment and hardware of each imaging device may result in the image generators of each device generating images that differ from imaging device to imaging device. It may be difficult and time consuming to programmatically adapt each image generator of each imaging device to produce an expected output image given a set of input signals.

As described herein, a computing system may generate a separate transformation model machine learning model for each imaging device of the plurality of imaging devices. Each transformation model may be trained to transform generated images from a corresponding imaging device to look more like the images that a properly calibrated image generator (i.e., a reference image generator) would generate from the same input signals. In this way, even though each imaging device may have its own calibration parameters, the imaging devices all generate consistent, calibrated images.

In some examples a method includes obtaining a current initial image generated by an image generator of an imaging device based on current input signals of sensors of the imaging device, and applying a transformation model to the current initial image to generate a current transformed image, wherein the transformation model is a machine-learning model that has been trained to generate transformed images that more closely resemble reference images generated by a reference image generator.

In some examples a computing system includes: an imaging device; a memory; and one or more processors in communication with the memory, the one or more processors configured to: obtain a current initial image generated by an image generator of the imaging device based on current input signals of sensors of the imaging device; and apply a transformation model to the current initial image to generate a current transformed image, wherein the transformation model is a machine-learning model that has been trained to generate transformed images that more closely resemble reference images generated by a reference image generator.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
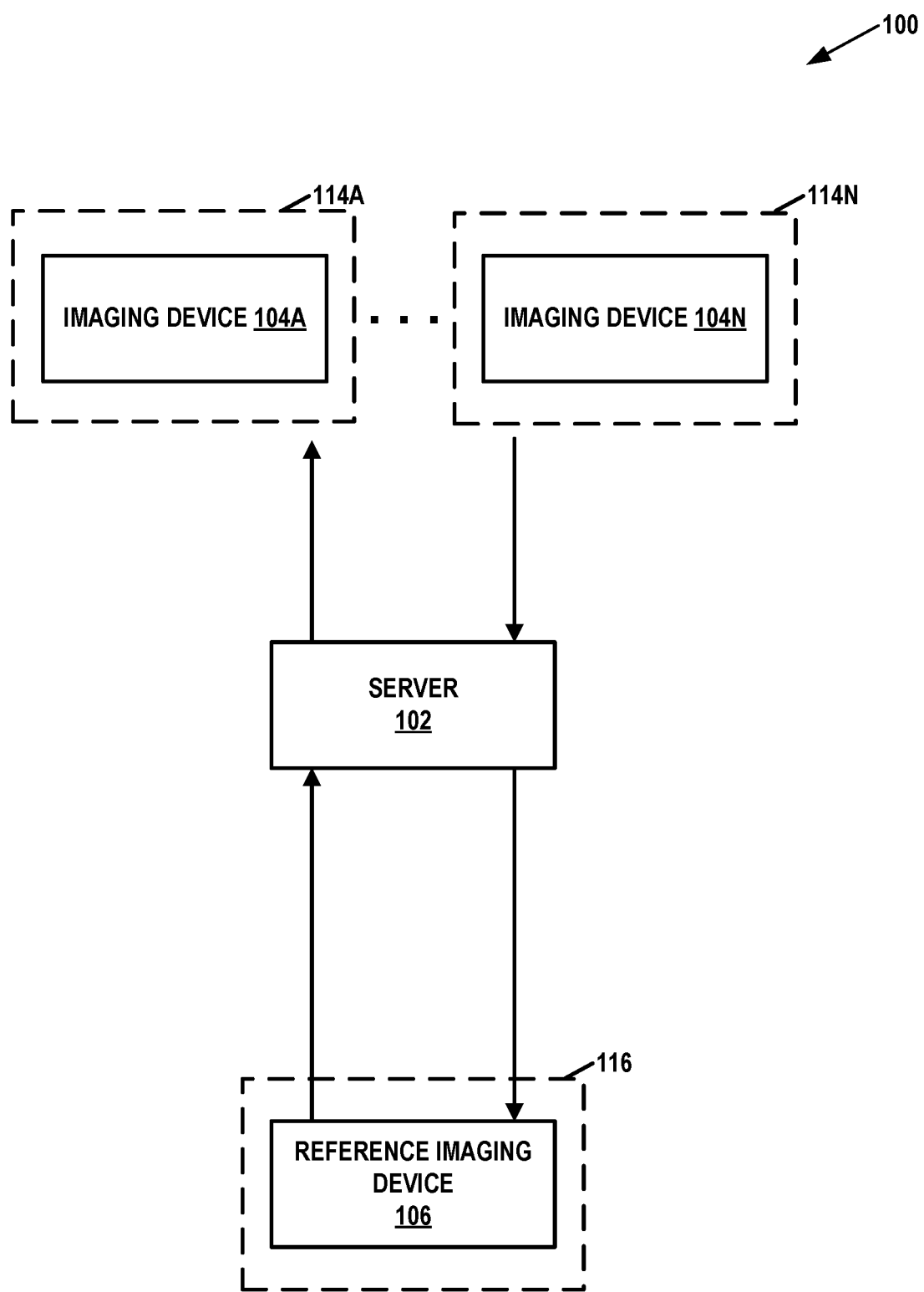
FIG. 1 is a block diagram illustrating an example system in accordance with one or more aspects of this disclosure.

Imaging devices have sensors to sense one or more parameters of ground truth data. For example, an x-ray imaging device includes a sensor array to detect x-rays. The sensors may generate input signals representing the parameters to an imaging device, and an image generator of the device may use the signals to generate an image. This may be particularly useful for medical diagnostics, as a physician may view the image to obtain information about the ground truth parameters. Ideally, each imaging device of a plurality of imaging devices should generate the same output image when analyzing the same ground truth data. Consistent output images are important for various reasons, including ease of diagnosis by healthcare workers, ensuring consistent image input to other programs (e.g., machine learning models), and so on. The sensors of each imaging device may be calibrated to the particular environment experienced by the imaging device. Similarly, the image generator of each imaging device may have one or more calibration parameters to compensate for different environmental conditions and sensor sensitivities. However, small differences in the environment and small differences in the sensors of each imaging device may result in the image generators of each device generating images that differ from imaging device to imaging device. For example, electrical noise and component to component drift within the imaging device may result in images that differ from imaging device to imaging device. It may be difficult and time consuming to programmatically adapt each image generator of each imaging device to produce an expected output image in response to the particular input signals received from the sensors of each imaging device in their respective environments.

This disclosure describes techniques that may address one or more of these issues. As described herein, a computing system may generate a separate transformation model for each imaging device that transforms the generated images to look more like the images that a properly calibrated image generator (i.e., a reference image generator) would generate from the same input signals. In this way, even though each imaging device may have its own calibration parameters, the imaging devices all generate consistent, calibrated images.

The transformation models may be machine learning models, where each transformation model is trained using a set of common training data, as well as a set of unique training data. The common training data may be generated by a properly calibrated reference image generator and used to train all of the plurality of transformation models. The unique training data may be unique for each transformation model, and may be generated by the respective image generator with which each transformation model is implemented.

The computing system may generate the set of common training data using a reference imaging device (also referred to as a "master imaging device") running a reference (a.k.a., "master") image generator. The reference image generator may have been properly calibrated to produce desired images from input signals. The computing system may inject a plurality of sets of simulated input signals to the reference image generator. The plurality of sets of simulated input signals may include a wide variety of possible combinations of input signals to the reference image generator. The reference image generator may generate a reference image for each set of simulated input signals. The computing system may store the plurality of sets of simulated input signals, as well as the plurality of reference images generated from the simulated input signals, to a database in memory, where each reference image corresponds to a set of simulated input signals. For example, the computing system may assign an identification to each reference image associating the reference image with the set of simulated input signals from which the reference image was generated.

The computing system may generate the set of unique training data for each transformation model using the respective image generator with which each transformation model will be implemented. For ease of description, the process for generating a set of unique training data for a single transformation model will be described. The computing system may receive the common training data, including the sets of simulated input signals and the corresponding reference images, from the database in memory. The computing system may inject the plurality of sets of simulated input signals to an image generator of an imaging device on which the transformation model will be implemented. For each of the plurality of sets of simulated input signals, the image generator generates a training image that may or may not be similar to the reference image generated by the reference image generator for the same set of simulated input signals. The computing system may store the plurality of training images to a database in memory, where each training image corresponds to a set of simulated input signals, as well as a reference image. For example, the computing system may assign an identification to each training image associating each training image with the set of simulated input signals from which each training image was generated, as well as associating each training image with the reference image generated from the same set of simulated input signals.

Each transformation model may be trained using a respective plurality of training images as input (that is, the plurality of training images generated by the image generator of the imaging device in which the transformation model will be implemented), and the plurality of reference images as output. In some examples, each transformation model is trained in the cloud. In some examples, each transformation model is trained in a computing system local to the image generator alongside which the transformation model will be implemented. In this way, each transformation model may be trained to generate transformed images for an imaging device that more closely resemble the reference images generated by the reference image generator. Each transformation model may be periodically retrained as described above, which may compensate for any drift within the sensors or otherwise of the imaging device in which each transformation model is implemented.

After a transformation model is implemented in an imaging device, the imaging device may be used to sense and image one or more parameters of ground truth data. Sensors of the imaging device may generate input signals to an image generator of the imaging device. The image generator may generate an initial image based on the input signals. The transformation model may be applied to the initial image to generate a transformed image. Due to the training process performed on the transformation model, the transformed image may more closely resemble a reference image that would be generated by a properly calibrated reference image generator given the same input signals. In some examples, the imaging device may compare the initial image to the transformed image and determine whether a difference between the initial image and the transformed image exceeds a threshold. In response to determining that the difference exceeds a threshold, the imaging device may generate an alert indicating that further calibration may be necessary.

In this way, a plurality of imaging devices may be calibrated in a customized fashion to ensure that output images from the imaging devices are consistent across the different imaging devices.

FIG. 1 is a block diagram illustrating an example system 100 in accordance with one or more aspects of this disclosure. In the example of FIG. 1, system 100 includes a reference imaging device 106 within a reference computing system 116, and a plurality of imaging devices 104A-104N (imaging devices 104) each within their own device computing system 114A-114N (device computing systems 114). System 100 also includes a server 102 in communication with device computing systems 114 and reference computing system 116.

Reference computing system 116 and device computing systems 114 are examples of computing device systems containing computing devices that are configured to perform one or more example techniques described in this disclosure. Reference computing system 116 and device computing systems 114 may include various types of computing devices, such as server computers, personal computers, smartphones, laptop computers, and other types of computing devices. In some examples, reference computing system 116 and device computing systems 114 each include multiple computing devices that communicate with each other. In other examples, reference computing system 116 and device computing systems 114 each include only a single computing device. Reference computing system 116 and device computing systems 114 may each include processing circuitry, one or more storage systems, a display, and one or more communication units.

The communication units of reference computing system 116 and device computing systems 114 may allow reference computing system 116 and device computing systems 114 to communicate with other devices via server 102. For example, reference computing system 116 may transmit a set of common training data to one or more of device computing systems 114 via server 102, including a plurality of sets of simulated input signals, and a plurality of reference images generated from the simulated input signals. Server 102 may include various types of communication networks including one or more wide-area networks, such as the Internet, local area networks, and so on. In some examples, server 102 may include wired and/or wireless communication links.

Reference imaging device 106 and imaging devices 104 may include one or more devices configured to generate images. For example, reference imaging device 106 and imaging devices 104 may include devices for generating computerized tomography (CT) images, magnetic resonance imaging (Mill) images, x-ray images, or other imaging devices. Each of reference imaging device 106 and imaging devices 104 may include one or more sensors to sense one or more parameters of ground truth data and generate input signals representing the ground truth parameters. For example, the sensors may include one or more of an electrochemical cell, a spectrometer, or an x-ray detector. The input signals may be sensor signals, for example single-point output signals or varying time-series signals. Reference imaging device 106 and imaging devices 104 may also include an image generator to generate an image from the input signals. In some examples, reference imaging device 106 and imaging devices 104 may perform automated biochemical tests that convert electrical signals collected on two or more signal acquisition channels to a scatter plot that is visually inspected by a clinician. In some examples, reference imaging device 106 and imaging devices 104 may perform medical image scanning and produce diagnostic output images that may be reviewed for unusual signatures (e.g., cancer detection). In some examples, reference imaging device 106 and imaging devices 104 may generate a 3D scatter image from optical measurements using direct flow cytometry.

Ideally, each imaging device of reference imaging device 106 and imaging devices 104 should generate the same output image when sensing the same ground truth data. However, small differences in the environment and small differences in the hardware of each imaging device may result in the image generators of reference imaging device 106 and imaging devices 104 generating images that differ from imaging device to imaging device. Device variation may be due to a variety of factors. For example, imaging devices may contain thousands of components (e.g., electronics, mechanical, calibrators, reagents etc.) that each have specific design specifications. However, there may be component to component variation/drift that results in natural performance differences between different devices. In some examples, electrical noise may impact the performance of the imaging device. For example, a difference between device ground and earth ground in imaging devices may vary from device to device.

The sensors of each imaging device may be calibrated to the particular environment experienced by the imaging device, but may not be able to sufficiently compensate for all environmental or hardware differences. The image generator of each of reference imaging device 106 and imaging devices 104 may have one or more calibration parameters to further compensate for environmental and hardware differences between imaging devices 104. It may be difficult and time consuming to programmatically adapt each image generator of each imaging device to produce an expected output image in response to the particular input signals received from the sensors of each imaging device in their respective environments.

As described herein, a single image generator (a reference image generator of reference imaging device 106) may be calibrated to as close to ideal parameters as possible. Using a plurality of simulated sensor signals applied to the reference image generator, the reference image generator may generate a plurality of corresponding reference images. Using the plurality of simulated sensor signals and the plurality corresponding reference images, system 100 may generate a separate transformation model for each of imaging devices 104. In some examples, each of imaging devices 104 may autonomously create its own transformation model using the plurality of simulated sensor signals and the plurality of corresponding reference images. Each transformation model may transform images generated by imaging devices 104 to look more like images generated by reference imaging device 106 from the same input signals. In this way, even though each imaging device may have its own calibration parameters, the reference imaging device 106 and imaging devices 104 all generate consistent, calibrated images.

For example, each of device computing system 114 includes an imaging device 104 (e.g., device computing system 114A includes imaging device 104A), and may also include a memory, as well as one or more processors in communication with the memory and configured to perform one or more techniques of this disclosure. Device computing system 114A may include one or more processors configured to obtain a current initial image generated by an image generator of imaging device 104A based on current input signals of sensors of imaging device 104A. The current input signals may be based on one or more ground truth parameters sensed by the sensors of imaging device 104A. For example, the current input signals may be based on an x-ray of a patient's jaw. The current initial image may be image data readable by a printer or a display program of imaging device 104A. The one or more processors of device computing system 114A may also be configured to apply a transformation model to the current initial image to generate a current transformed image, wherein the transformation model is a machine-learning model that has been trained to generate transformed images that more closely resemble reference images generated by a reference image generator of reference imaging device 106.

Figure 2:
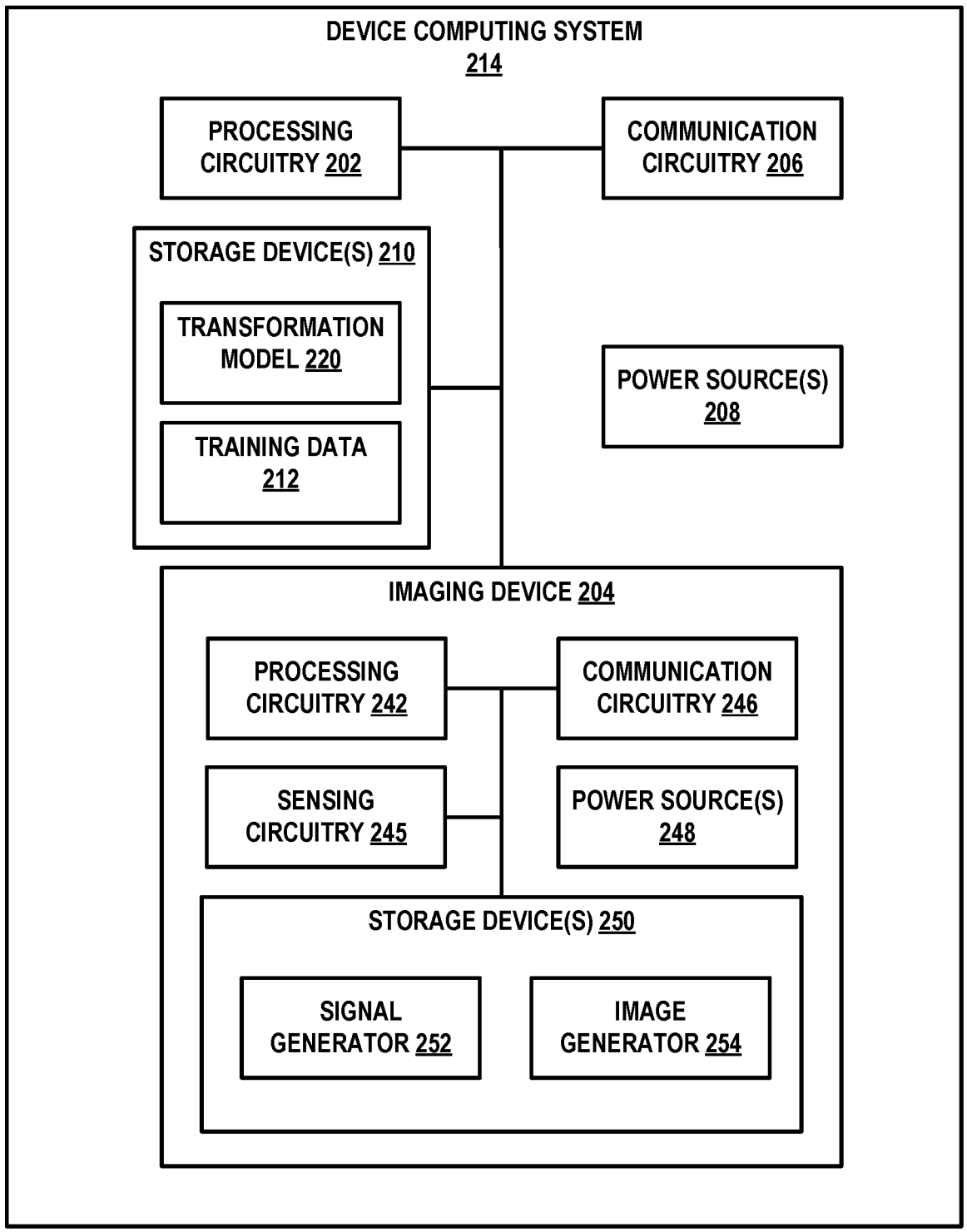
FIG. 2 is a block diagram illustrating an example device computing system for running a transformation model, in accordance with the techniques of this disclosure.

FIG. 2 is a block diagram illustrating an example device computing system 214 for running a transformation model 220, in accordance with the techniques of this disclosure. FIG. 2 illustrates only one example of device computing system 214, without limitation on many other example configurations of device computing system 214. Device computing system 214 may be an example of a device computing system 114 of FIG. 1 and/or reference device computing system 116 of FIG. 1. As shown in the example of FIG. 2, device computing system 214 includes processing circuitry 202, imaging device 204, communication circuitry 206, one or more power sources 208, and one or more storage devices 210. Device computing system 214 may include other components, for example one or more computing devices in communication with one another and configured to perform the techniques of this disclosure attributed to device computing system 214. Processing circuitry 202, communication circuitry 206, power sources 208, and storage devices 210 may reside, in whole or in part, on one or multiple of the computing devices of device computing system 214. For example, processing circuitry 202, communication circuitry 206, and storage devices 210 may reside in whole or in part in imaging device 204 as processing circuitry 232, communication circuitry 246, and storage devices 250. Similarly, processing circuitry 232, communication circuitry 246, and storage devices 250 may reside in whole or in part in imaging device 204 or multiple computing devices of device computing system 214. Power source(s) 208 may provide electrical energy to processing circuitry 202, communication circuitry 206, storage device(s) 210 and imaging device 204. Power source(s) 248 may provide electrical energy to processing circuitry 242, communication circuitry 246, storage device(s) 250, and imaging device 204.

Processing circuitry 202 and processing circuitry 242 may include one or more processors configured to perform processing functions. For instance, one or more of processors may be a microprocessor, digital signal processors (DSPs), application-specific integrated circuit (ASIC), field-programmable gate array (FPGA), discrete logic, software, hardware, firmware, other type of processing circuit, or any combinations thereof. In general, processing circuitry 202 and processing circuitry 242 may be implemented as fixed-function circuits, programmable circuits, or a combination thereof. In some examples, processing circuitry 202 and processing circuitry 242 may read and execute instructions stored by storage devices 210 and storage devices 250. Processing circuitry 202 and processing circuitry 242 may include fixed-function processors and/or programmable processors.

Processing circuitry 202 and processing circuitry 242 may include arithmetic logic units (ALUs), elementary function units (EFUs), digital circuits, analog circuits, and/or programmable cores, formed from programmable circuits. In examples where the operations of processing circuitry 202 and processing circuitry 242 are performed using software executed by the programmable circuits, storage devices 210 and/or storage devices 250 may store the object code of the software that processing circuitry 202 and processing circuitry 242 receives and executes, or another memory within processing circuitry 202 (not shown) may store such instructions. Examples of the software include software designed for image analysis, including image segmentation.

Although shown in FIG. 2 as being integrated into device computing system 214, processing circuitry 202 may be a separate component integrated into another device or system, such as a personal computer or a cloud computing device. Similarly, processing circuitry 242 may be a separate component integrated into another device or system outside of imaging device 204. Thus, it should be understood that techniques of this disclosure may be performed, at least in part, by processing circuitry not integrated into device computing system 214 and that the examples described herein are for purposes of illustration and are without limitation.

Communication circuitry 206 may enable device computing system 214 to send data to and receive data from one or more computing devices of device computing system 214 and other computing devices (e.g., via a communications network, such as a local area network or the Internet). Similarly, communication circuitry 246 may enable imaging device 204 to send data to and receive data from one or more computing devices of device computing system 214 and other computing devices. In some examples, communication circuitry 206 and communication circuitry 246 may include wireless transmitters and receivers that enable device computing system 214 and imaging device 204 to communicate wirelessly with other computing devices. Examples of communication circuitry 206 and communication circuitry 246 may include network interface cards, Ethernet cards, optical transceivers, radio frequency transceivers, or other types of devices that are able to send and receive information. Other examples of such communication units may include BLU-ETOOTH™, 3G, 4G, 5G, and WI-FI™ radios, Universal Serial Bus (USB) interfaces, etc. Device computing system 214 may use communication circuitry 206 to communicate with one or more other computing devices or systems, such as a server or other device computing systems. Similarly, imaging device 204 may use communication circuitry 246 to communicate with one or more other computing devices or systems. Communication circuitry 206 and communication circuitry 246 may be included in a single device or distributed among multiple devices.

Device computing system 214 may include imaging device 204. Imaging device 204 may be an example of reference imaging device 106 from FIG. 1 or one of imaging devices 104 from FIG. 1. In the example of FIG. 2, imaging device 204 includes processing circuitry 242, communication circuitry 246, sensing circuitry 245, power sources 248, and storage devices 250. As described above, although processing circuitry 242, communication circuitry 246, and storage devices 250 are shown as being integrated into imaging device 204, processing circuitry 242, communication circuitry 246, and storage devices 250 may reside, in whole or in part, on one or multiple of the computing devices of device computing system 214. In some examples, processing circuitry 242, communication circuitry 246, and storage devices 250 may reside in whole or in part on a server of a computing system (e.g., system 100 of FIG. 1) that includes device computing system 214.

Imaging device 204 may be configured to generate image data. For example, imaging device 204 may be a device for generating computerized tomography (CT) images, magnetic resonance imaging (MRI) images, x-ray images, or another imaging device. Imaging device 204 may include one or more sensors of sensing circuitry 245 to generate input signals representing ground truth parameters, and may also include an image generator 254 configured to generate an image from the input signals. Imaging device 204 may be only one imaging device of a plurality of imaging devices in communication with a computing system (e.g., system 100 of FIG. 1). In some examples, imaging device 204 may be a reference imaging device with a reference image generator that has been calibrated with as close to ideal parameters as possible for generating images from input signals.

Device computing system 214 may include storage devices 210 and imaging device 204 may include storage devices 250. In some examples, storage devices 210 and 250 are the same. Storage devices 210 may include one or more computer-readable storage media. For example, storage devices 210 may be configured for long-term, as well as short-term storage of information, such as instructions, data, or other information used by device computing system 214. In some examples, storage devices 210 may include non-volatile storage elements. Examples of such non-volatile storage elements include magnetic hard discs, optical discs, solid state discs, and/or the like. In other examples, in place of, or in addition to the non-volatile storage elements, storage devices 210 may include one or more so-called "temporary" memory devices, meaning that a primary purpose of these devices may not be long-term data storage. For example, the devices may comprise volatile memory devices, meaning that the devices may not maintain stored contents when the devices are not receiving power. Examples of volatile memory devices include random-access memories (RAM), dynamic random-access memories (DRAM), static random-access memories (SRAM), etc. References to "memory" within the disclosure may be references to storage devices such as storage devices 210.

Storage devices 210 of device computing system 214 may store instructions that, when executed by processing circuitry 202, cause device computing system 214 to perform various activities. For instance, in the example of FIG. 2, storage devices 210 may store instructions that, when executed by processing circuitry 202, cause device computing system 214 to perform activities associated with imaging device 204 and/or transformation model 220. In some examples, storage devices 250 may store instructions that, when executed by processing circuitry 242, cause imaging device 204 to perform activities associated with sensing circuitry 245, image generator 254 and/or signal generator 252. For ease of explanation, rather than discussing device computing system 214 performing activities when processing circuitry 202 executes instructions, this disclosure may simply refer to imaging device 204, transformation model 220, or components thereof as performing the activities, or may directly describe device computing system 214 as performing the activities.

Although depicted in FIG. 2 as stored in storage devices 250, in some examples, signal generator 252 may be a device external to imaging device 204 and in communication with imaging device 204. Signal generator 252 may be configured to generate one or more sets of simulated sensor signals. The one or more sets of simulated sensor signals may simulate real world inputs to sensing circuitry 245 of imaging device 204.

As shown in FIG. 2, storage devices 210 includes transformation model 220. Although shown in FIG. 2 as being integrated into storage devices 210 of device computing system 214, transformation model 220 may be implemented on a server in communication with device computing system 214 and imaging device 204. For example, transformation model 220 may be implemented by processing circuitry of server 102 of FIG. 1, and may be stored in memory of storage devices of server 102 of FIG. 1. In some examples, transformation model 220 may be implemented in storage devices 250 of imaging device 204.

Transformation model 220 may include one or more of various different types of machine learning (ML) models that perform classification, regression, clustering, anomaly detection, recommendation generation, and/or other tasks. For instance, transformation model 220 may be or may include one or more artificial neural networks ("neural networks"). A neural network may include a group of connected nodes, which also may be referred to as neurons or perceptrons. A neural network may be organized into one or more layers. Neural networks that include multiple layers may be referred to as "deep" networks. A deep network may include an input layer, an output layer, and one or more hidden layers positioned between the input layer and the output layer. The nodes of the neural network may be fully connected or non-fully connected. In some implementations, the neural networks may be convolutional neural networks (CNNs). A CNN may include one or more convolutional layers that perform convolutions over input data using learned filters or kernels. CNNs may be especially useful for vision problems such as when the input data includes imagery such as still images or video.

Transformation model 220 may be trained to generate transformed images that more closely resemble reference images generated by a reference image generator. For example, transformation model 220 may be trained using a set of training data 212 that includes a plurality of initial training images generated by image generator 254 of imaging device 204 from a plurality of training input signals, and a plurality of reference images generated by the reference image generator of a reference imaging device from the same training input signals. Processing circuitry 202 may be configured to generate training data 212, wherein each initial training image of the plurality of initial training images includes a label indicating a corresponding reference image of the plurality of reference images. Processing circuitry 202 may further be configured to train transformation model 220 based on training data 212, wherein the plurality of initial training images is applied to transformation model 220 as input and the plurality of reference images is generated as output. In some examples, transformation model 220 is implemented on a server in communication with device computing system 214 and imaging device 204. In some examples, transformation model 220 is trained on one or more cloud computing devices, for example one or more computing devices of a server. For example, imaging device 204 may receive sensor signals via sensing circuitry 245, generate an initial image via image generator 254, send the initial image to one or more cloud computing devices via communication circuitry 246 where the initial image is applied to transformation model 220, and receive a transformed image from transformation model 220 via communication circuitry 246. Although depicted as stored on storage devices 210, in some examples, training data 212 is stored on other storage devices in communication with device computing system 214, such as storage devices 250, or one or more storage devices on a server of a computing system (e.g., server 102 of system 100 of FIG. 1) that includes device computing system 214.

In order to generate training data 212, processing circuitry 202 may be configured to generate a set of common training data, as well as a set of unique training data. The common training data may be generated by a properly calibrated reference image generator and used to train a plurality of transformation models implemented by a plurality of imaging devices. The unique training data may be individual for each transformation model, and may be generated by the respective image generator with which each transformation model is implemented.

The set of common training data may include a plurality of sets of training input signals and a plurality of reference images. In some examples, in order to generate the set of common training data, device computing system 214 may be a reference device computing system and imaging device 204 is a reference imaging device (i.e., when image generator 254 is a reference image generator that has been calibrated to as close to ideal parameters as possible). Processing circuitry 202 of the reference device computing system may be configured to receive a plurality of sets of training input signals representing possible sensor signals. For example, the training input signals may be sensor signals that include one or more of single-point output signals or varying time-series. In some examples, the training input signals are retrieved from memory in storage devices 210. The training input signals may have been stored there by an outside source (e.g., a programmer, technician, physician, etc.). In some examples, the plurality of sets of training input signals may be simulated signals. For example, in order to generate the plurality of sets of training input signals, signal generator 252 of the reference imaging device may randomly or systematically generate the plurality of sets of training input signals and store them in storage devices 210. The training input signals may represent a plurality of possible sensor signals receivable from sensors of imaging device 204.

In some examples, in order to generate the plurality of reference images of the set of common training data, processing circuitry 202 of the reference device computing system may be configured to inject the plurality of sets of training input signals to the reference image generator of the reference imaging device. During normal operation, image generator 254 of imaging device 204 may receive sensor signals directly from sensors or sensing circuitry of imaging device 204. However, because the training input signals are simulated (e.g., generated programmatically rather than measured using sensors), processing circuitry 242 may inject the training input signals directly to image generator 254 of imaging device 204 and bypass sensing circuitry 245. Using the plurality of sets of training input signals, the reference image generator of the reference imaging device may generate the plurality of reference images. Each of the plurality of reference images is generated based on one set of the plurality of sets of training input signals. In this way, the reference image generator may generate a reference image corresponding to each set of training input signals, i.e., each reference image may be associated with a set of training signals from which that reference image was generated. Processing circuitry 242 of the reference imaging device may store the plurality of sets of training input signals and the plurality of reference images in a database in memory (e.g., storage devices 250, storage devices 210, or a server storage device). Each set of the plurality of sets of training input signals may include a label identifying the associated reference image of the plurality of reference images. In some examples, each reference image includes a label identifying the associated set of training input signals. Together, the plurality of sets of training input signals and the plurality of corresponding reference images may make up the set of common training data. Because the reference image generator has been calibrated to as close to ideal parameters as possible, the generated reference images may be as close to the ideal generated images that an imaging device 204 can generate.

In some examples, device computing system 214 is not a reference device computing system. For example, device computing system 214 may not contain a reference imaging device with a reference image generator that has been calibrated with as close to ideal parameters as possible. In these examples, imaging device 204 may use a transformation model 220 that has been trained using the set of common training data and a set of unique training data to generate transformed images that more closely resemble images generated by a properly calibrated reference image generator.

In some examples, device computing system 214 may generate the set of unique training data using the set of common training data generated by the reference device computing system. For example, processing circuitry 202 of device computing system 214 may receive the plurality of sets of training input signals from a database in memory. The database may be one or more storage devices of the computing system that includes device computing system 214. For example, using communication circuitry 206, device computing system 214 may receive the plurality of sets of training input signals from a server in communication device computing system 214 (e.g., server 102 of FIG. 1). In some examples, the server may have received the set of common training data from a reference device computing system including a reference imaging device with a reference image generator. In some examples, device computing system may regularly or sporadically receive updated sets of common training data from the server and save the set of common training data to storage devices 210 as part of training data 212.

To generate the set of unique training data, processing circuitry 202 may inject the plurality of sets of training input signals to image generator 254 of imaging device 204. Using the plurality of sets of training input signals, image generator 254 may generate a plurality of initial training images. Each of the plurality of initial training images is generated based on one of the plurality of sets of training input signals. In this way, image generator 254 may generate an initial training image corresponding to each set of training input signals, i.e., each initial training image may be associated with a set of training signals from which that initial training image was generated. Processing circuitry 242 of imaging device 204 may store the plurality of initial training images in a database in memory (e.g., storage devices 250, storage devices 210, or a server storage device). The plurality of initial training images may make up the unique training data. Together, the unique training data and the common training data may make up training data 212. Each initial training image of the plurality of initial training images may include a label identifying the associated reference image of the plurality of reference images that was generated from the same set of training input signals of the plurality of sets of training input signals. In some examples, each set of training input signals includes a label identifying the associated training initial image, as well as a label identifying the associated reference image.

In some examples, device computing system 214 may be one of a plurality of device computing systems each containing an imaging device, all in a larger computing system (e.g., device computing systems 114 with imaging devices 104 of system 100 of FIG. 1). A plurality of transformation models may be trained for the plurality of imaging devices, where each imaging device implements a corresponding transformation model. For each respective imaging device of the plurality of imaging devices, processing circuitry of the system may be configured to generate a training dataset. Each training dataset may include the set of common training data and a respective set of unique training data. The set of common training data may include the plurality of sets of training input signals and the plurality of reference images generated by the reference image generator using the training input signals. For each respective imaging device of the plurality of imaging devices, processing circuitry of the system may be configured to generate a plurality of initial training imaged generated by a respective image generator of the respective imaging device using the training input signals. Processing circuitry of the system may be configured to train each transformation model of the plurality of transformation models based on a corresponding training dataset. That is, the transformation model implemented by a respective imaging device may be trained using the set of unique training data generated by that same respective imaging device.

For example, a reference imaging device may generate a set of common training data as described above, including a plurality of sets of training input signals and a plurality of reference images. A first imaging device of the plurality of imaging devices may generate a first set of unique training data as described above, including a first set of initial training images. A first transformation model may be trained using the set of common training data as well as the first set of unique training data. A second imaging device of the plurality of imaging devices may generate a second set of unique training data as described above, including a second set of initial training images. A second transformation model may be trained using the set of common training data as well as the second set of unique training data. In this way, each transformation model of the plurality of transformation models may be trained to be implemented by a respective imaging device. In some examples, each transformation model of the plurality of transformation models is trained on one or more cloud computing devices in communication with device computing system 214.

Although depicted in FIG. 2 as residing in storage devices 210, transformation model 220 may reside in another storage device of device computing system 214 (e.g., storage devices 250), or in a storage device of another computing system in communication with device computing system 214 (e.g., one or more storage devices of server 102 of FIG. 1, one or more storage devices of reference device computing system 116 of FIG. 1). Similarly, each transformation model of a plurality of transformation models may be implemented on a server in communication with each imaging device of a plurality of imaging devices. Each transformation model of the plurality of transformation models may correspond to a respective imaging device of the plurality of imaging devices, such that, each respective imaging device may implement the corresponding transformation model when generating transformed images that more closely resemble reference images generated by a reference image generator.

After transformation model 220 has been trained for imaging device 204, imaging device 204 may use transformation model 220 to generate transformed images. For example, processing circuitry 242 may generate, using sensing circuitry 245, a set of current input signals based on one or more ground truth parameters sensed by the sensors of sensing circuitry 245. In some examples, the set of current input signals may represent signals from an x-ray scan of a patient. Using the current input signals, processing circuitry 242 may generate, via image generator 254, a current initial image. In some examples, the current initial image may be image data for an x-ray image of a patient. Processing circuitry 242 may apply transformation model 220 to the current initial image to generate a current transformed image. The current transformed image may more closely resemble a reference image generated by a properly calibrated reference image generator. In some examples, the current transformed image may be image data for an x-ray image of a patient with less blurring, and a more accurate visual depiction of the actual state of the patient's body that has been x-rayed.

Transformation model 220 may be used to help imaging device 204 overcome small differences in the environment and circuitry of imaging device 204, and generate images that resemble images generated by a properly calibrated reference image generator. In some examples, the differences in the environment and circuitry of imaging device 204 are large enough that they warrant further investigation. For example, large differences in the environment or circuitry of imaging device 204 from a properly calibrated imaging device may indicate a deeper underlying problem that needs to be fixed. For example, one or more sensors may be malfunctioning, or one or more portions of the circuitry of imaging device 204 may be physically damaged. In some examples, these problems may be identified by determining a difference between images generated by image generator 254 before being transformed, and after being transformed by transformation model 220.

For example, processing circuitry 242 may be configured to determine whether a difference between a current initial image and a current transformed image exceeds a threshold. In response to the difference between the current initial image and the current transformed image exceeding a threshold, processing circuitry 242 may be configured to generate an alert. In some examples, the alert may indicate that imaging device 204 should be investigated. In some examples, the alert may indicate that sensors and/or programming of imaging device 204 may need to be individually calibrated.

Figure 3:
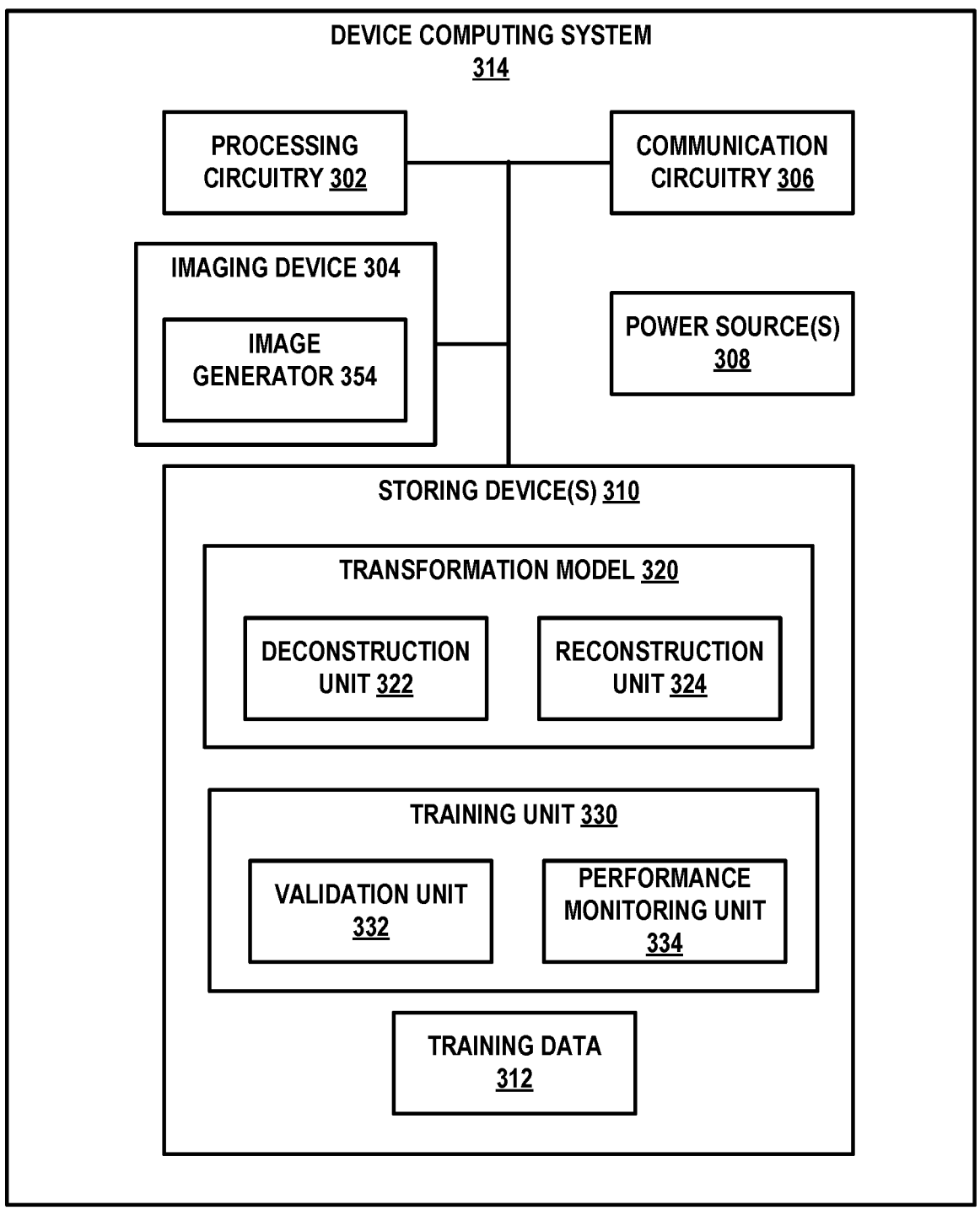
FIG. 3 is a block diagram illustrating an example device computing system for training a transformation model, in accordance with the techniques of this disclosure.

FIG. 3 is a block diagram illustrating an example device computing system 314 for training a transformation model 320, in accordance with the techniques of this disclosure. Device computing system 314 may be an example of device computing system 214 of FIG. 2, or device computing system 114A of FIG. 1. In the example of FIG. 3, device computing system 314 includes processing circuitry 302, communication circuitry 306, imaging device 304, one or more power sources 308, and one or more storage devices 310. Processing circuitry 302 may be an example of processing circuitry 202 of FIG. 2. Communication circuitry 306 may be an example of communication circuitry 206 of FIG. 2. Imaging device 304, containing image generator 354, may be an example of imaging device 204 containing image generator 254 of FIG. 2. Power sources 308 may be an example of power sources 208 of FIG. 2. Storage devices 310 may be an example of storage devices 210 of FIG. 2. Device computing system 314 may include other elements and structures not depicted in FIG. 3.

Storage devices 310 includes transformation model 320, training unit 330, and training data 312. Although depicted in FIG. 3 as residing in storage devices 310 of device computing system 314, in some examples, transformation model 320, training unit 330, and training data 312 may reside in another storage device of device computing system 314 (e.g., a storage device of imaging device 304), or in a storage device of another computing system in communication with device computing system 314 (e.g., one or more storage devices of server 102 of FIG. 1, one or more storage devices of reference device computing system 116 of FIG. 1).

Training data may include a set of common training data and a set of unique training data, as described above with respect to FIG. 2. The set of common training data may include a plurality of reference images generated by a properly calibrated reference image generator based on a plurality of sets of training input signals. The set of unique training data may include a plurality of initial training images generated by image generator 354 of imaging device 304 based on the same plurality of sets of training input signals. Each initial training image may correspond to a reference image that was generated using the same set of training input signals.

Transformation model 320 may be a machine learning model, and may be implemented in one of a variety of ways. For example, transformation model 320 may be a convolutional neural network (CNN). In some such examples, the CNN has a U-net or V-net architecture, as explained in more detail below with respect to FIG. 4. The CNN may generate one or more output images. In some examples, transformation model 320 uses image data as input, and generates transformed image data as an output. Transformation model 320 may include deconstruction unit 322 and reconstruction unit 324. Deconstruction unit 322 may be trained to deconstruct an input image into one or more feature maps. Reconstruction unit 324 may be trained to construct an output image based on the one or more feature maps, where the output image more closely resembles a reference image generated by a reference image generator.

Training unit 330 may train transformation model 320 using training data 312. Training data 312 may be generated as described above with respect to FIG. 2. In some examples, training unit 330 may generate a plurality of training datasets. For example, each of the plurality of training datasets may include a set of one or more initial training images as input, and a set of one or more reference images as output. Each of the training datasets may correspond to a different set of training input signals used to generate the set of one or more initial training images and the set of one or more reference images.

In some examples, as part of training transformation model 320, training unit 330 may perform a forward pass on the transformation model 320 using the initial training image (i.e., initial training image data) of a training dataset as input to transformation model 320. Training unit 330 may then perform a process that compares the resulting output of transformation model 320 to the corresponding expected output data. For example, training unit 330 may compare the resulting output image of transformation model 320 to a reference image (i.e., reference image data) of the training dataset, where the reference image used in the comparison was generated from the same set of training input signals as the initial training image. In some examples, a loss function performs the comparison by generating a loss value representing a difference between the output image of transformation model 320 and the reference image. In some examples, the loss function may calculate the loss value as a sum of absolute differences (SAD). The SAD may be calculated by summing the absolute difference between each pixel in the output image compared to the reference image. In some examples, the loss function may calculate the loss value as a mean squared deviation. In some examples, the reference image may represent an image of an x-ray of a patient from a properly calibrated image generator. Training unit 330 may then perform a backpropagation process based on the comparison to adjust parameters of transformation model 320 (e.g., weights of neurons of transformation model 320). Training unit 330 may repeat this process with other training datasets. Training unit 330 may use some of the training datasets for validation of transformation model 320.

Validation unit 332 may be configured to determine an accuracy of transformation model 320. For example, validation unit 332 may use transformation model 320 to determine if an example initial training image corresponding to a known reference image is properly transformed into a transformed image. Validation unit 332 may determine if transformation model 320 was able to correctly transform the initial training image. Additionally, validation unit 332 may be configured to determine the accuracy of transformation model 320 for a plurality of initial training images, each corresponding to a reference image, and validation unit 332 may be configured to identify an accuracy (e.g., a success rate) in which transformation model 320 correctly transforms the initial training images. If the accuracy is above a threshold accuracy value, transformation model 320 may be used to transform current initial images generated by image generator 354. If the accuracy is below the threshold accuracy value, training unit 330 may re-train transformation model 320 based on an updated set of training data. In some examples, the threshold accuracy value in which transformation model 320 may be used may be greater than or equal to 90%.

Training unit 330 may include performance monitoring unit 334. Performance monitoring unit 334 may monitor a performance of transformation model 320 after it is applied to transform current initial images generated by image generator 354. In some examples, performance monitoring unit 334 may determine an accuracy of transformation model 320 by comparing transformed images transformed by transformation model 320 with known reference images, where each transformed image has a corresponding reference image that was generated from the same set of input signals. For example, if transformation model 320 generates a first transformed image based on a first initial image generated from a first set of input signals, and the known reference image generated from the same first set of input signals differs from the first transformed image, performance monitoring unit 334 may record that transformation model 320 incorrectly transformed the first initial image. Performance monitoring unit 334 may continuously monitor an accuracy of transformation model 320. Performance monitoring unit 334 may determine a fraction of initial images which transformation model 320 correctly transforms. The fraction may represent a measured accuracy of transformation model 320. New sets of sensor signals may be analyzed by performance monitoring unit 334, the new sets of sensor signals representing data that was not used by training unit 330 to create transformation model 320. Processing circuitry may request updated reference images to be generated from the new sets of sensor signals by the reference image generator to be used by performance monitoring unit 334 to determine an accuracy of transformation model 320. In other words, performance monitoring unit 334 may test the accuracy of transformation model 320 continuously using new data. In some examples, if performance monitoring unit 334 determines that the accuracy of transformation model 320 is below a threshold accuracy value (e.g., 90%), performance monitoring unit 334 may output an instruction to re-train transformation model 320.

Training unit 330 may periodically (e.g., monthly, bi-monthly, yearly, or the like) re-train transformation model 320 based on an updated set of training data. The updated set of training data may include part or all of the original training data 312. Additionally, the updated set of training data may include sets of input sensor signals received by imaging device 304 during a time since transformation model 320 was last trained by training unit 330. In some examples, transformation model 320 may be retrained in one or more cloud devices in communication with device computing system 314 and imaging device 304.

After transformation model 320 has been trained for imaging device 304, imaging device 304 may use transformation model 320 to generate transformed images. For example, image generator 354 may receive a set of input signals and generate an initial image. Imaging device 304 may apply the initial image to transformation model 320 to generate a transformed image. By using transformation model 320, imaging device 304 may generate transformed images that more closely resemble images generated by a properly calibrated image generator, without having to calibrate the parameters of image generator 354. In some examples, the differences between an initial image and a transformed are large enough that they warrant further investigation. For example, if the difference between an initial image and the corresponding transformed image exceeds a threshold, it may indicate that there is something wrong with imaging device 304 or image generator 354 of imaging device 304. For example, one or more sensors of imaging device 304 may be malfunctioning, or one or more portions of the circuitry of imaging device 304 may be physically damaged. In some examples, these problems may be identified by determining a difference between initial images generated by image generator 354 and the corresponding transformed images.

Accordingly, processing circuitry 302 may be configured to determine whether a difference between a current initial image and a current transformed image exceeds a threshold, and generate an alert in response to determining that the difference between the current initial image and the current transformed image exceeds the threshold. To determine a difference between the current initial image and the current transformed image, processing circuitry 302 may apply a loss function. The loss function may generate a loss value representing the difference between the current initial image and the current transformed image. If the loss value exceeds a threshold, processing circuitry 302 may determine that the difference between the current initial image and the current transformed image exceeds the threshold. In some examples, the loss function may calculate the loss value as a sum of absolute differences. In response to determining that the loss value exceeds the threshold, processing circuitry 302 may be configured to generate an alert. In some examples, the alert may indicate that imaging device 304 may be damaged. In some examples, the alert may indicate that sensors and/or image generator 354 of imaging device 304 may need to be individually calibrated by a human operator.

Figure 4:
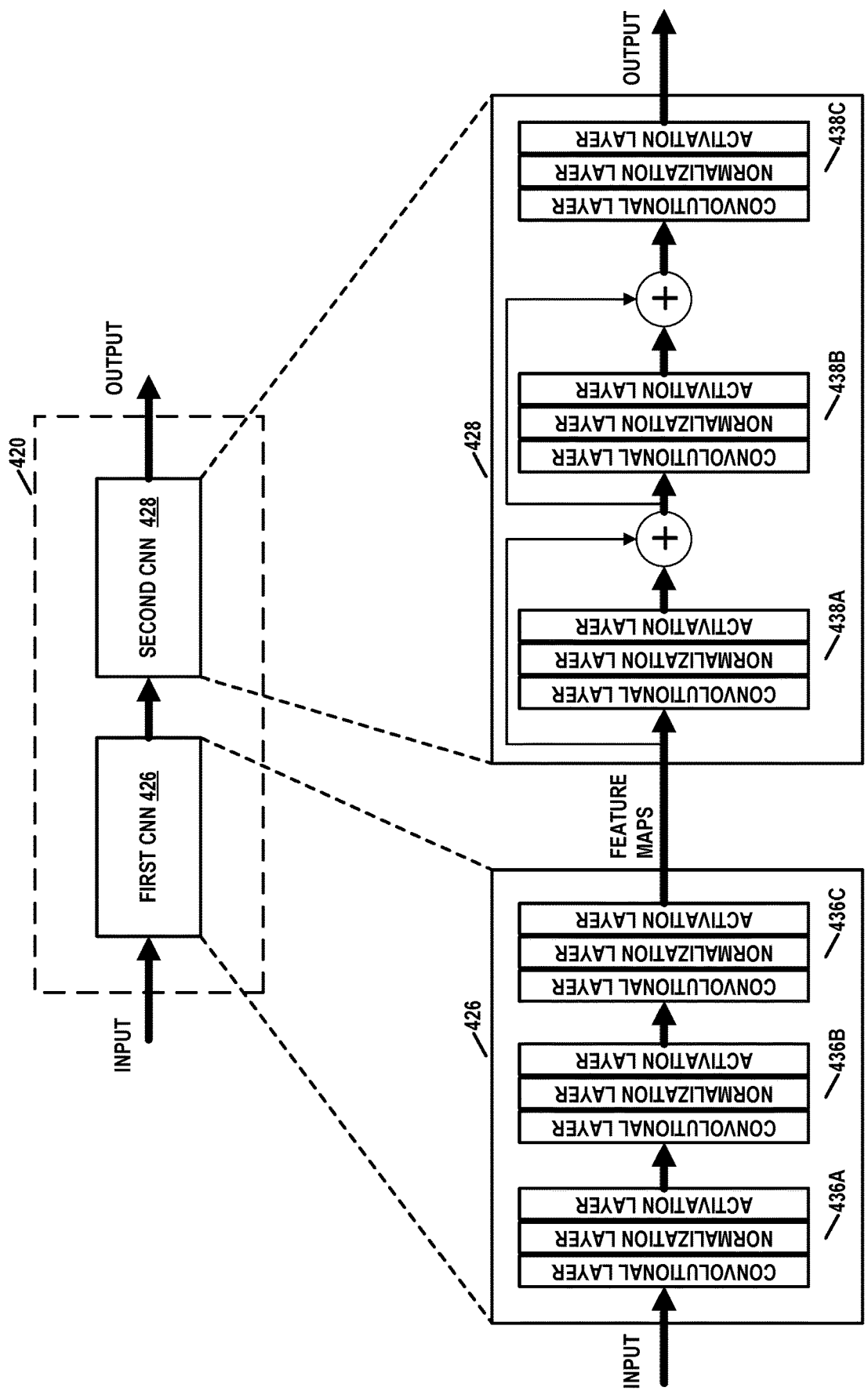
FIG. 4 is a block diagram illustrating an example machine learning transformation model, in accordance with the techniques of this disclosure.

FIG. 4 is a block diagram illustrating an example transformation model 420, in accordance with the techniques of this disclosure. Transformation model 420 may be a machine learning model that has been trained to generate transformed images that more closely resemble reference images generated by a reference image generator. Transformation model 420 may be an example of transformation model 320 of FIG. 3 or transformation model 220 of FIG. 2. Transformation model 420 may be stored in memory of one or more devices of a computing system, for example in imaging device 204 of device computing system 214 of FIG. 2. Processing circuitry of the one or more devices may execute transformation model 420.

One or more processors of the processing circuitry may be configured to receive, as input to first transformation model 420, a current initial image, for example from an image generator of an imaging device. In the example of FIG. 4, the input to transformation model 420 may include image data of one or more ground truth parameters sensed by sensing circuitry of an imaging device. For example, the image data may include a 2D or 3D image. In examples where the image data is a 3D image, a computing system may generate the 3D image based on a stack of 2D images arranged along a depth dimension. The location of each pixel in the stack of 2D images may be a voxel. The image data may include multi-dimensional arrays. An output of transformation model 420 may include a transformed image that more closely resembles a reference image generated by a reference image generator. The output image may have the same size as the input image. In other words, for each voxel of the input image, transformation model 420 may output a corresponding voxel.

In the example of FIG. 4, transformation model 420 includes a first CNN 426 and a second CNN 428. First CNN 426 may be referred to as an "encoder." The encoder extracts high level features in an input image. Second CNN 428 may be referred to as a "decoder." The decoder reconstructs information at a voxel level. Each CNN of transformation model 420 may include one or more convolutional layers, one or more normalization layers, and one or more activation layers.

First CNN 426 may be composed of a succession of convolution, normalization (and/or batch normalization), and activation (e.g., "ReLU") layers, and max pooling layers at each of levels 426A-426C (collectively, "levels 426"). In some examples, first CNN 426 does not contain any pooling layers. In some examples, the activation layers may apply a different type of activation function than a ReLU function (e.g., PReLU function, sigmoid function, etc.). The one or more processors may also be configured to generate, by first CNN 426, one or more feature maps based on the image input (e.g., a current initial image). The feature maps may be a code representing the input image.

In some examples, transformation model 420 may have a U-net architecture, including a transition layer between first CNN 426 and second CNN 428 that includes a series of convolution layers. In some examples, the convolutions at each level may use a 3×3×3 filter. In other examples, the number of channels, number of levels, filter size, and stride length may be different.

In some examples, transformation model 420 may have a V-net architecture, including a transition layer between first CNN 426 and second CNN 428 that includes a convolution with a stride of 2 which learns how to reduce the dimension of the feature maps by 2 to focus on the most important features. In some examples, the convolutions at each level use a 5×5×5 filter with a stride of 1. In other examples, the number of channels, number of levels, filter size, and stride length may be different.

The one or more processors may receive, by second CNN 428, the feature maps as input, and generate, as output of second CNN 428, the current transformed image based on the one or more feature maps. Second CNN 428 may be symmetrically built, including "Up" convolutions (sometimes referred to as "deconvolutions"), which may include doubling the size of the feature maps at each level of levels 438A-438C (collectively, "levels 438"). In some examples, transformation model 420 may include bridges (not depicted) that enable connections between some high-level features that are extracted to help the reconstruction at the voxel level in the decoder. Thus, the input arrays for each of levels 438 may be a concatenation of data generated by an up-convolution layer and data derived from a corresponding level of the encoder. In the example of FIG. 4, the input arrays for each of levels 438 may be a concatenation of data generated by an up-convolution layer, and data generated from the previous level of the decoder. The output of the decoder may include a plurality of output images corresponding to a respective depth-dimension layer in the plurality of depth-dimension layers. The output of second CNN 428 may be a transformed image that more closely resembles a reference image generated by a properly calibrated reference image generator.

Although each level of levels 436 and levels 438 in FIG. 4 is depicted as containing a convolution layer, normalization layer, and activation layer, in some examples each level contains fewer layers or more layers. For example, a final layer of second CNN 428 may be a convolution layer. Although each level of levels 438 is depicted in FIG. 4 as containing a "convolution" layer, these may actually be "deconvolution" layers that produce more output values than they take as input values.

Figure 5:
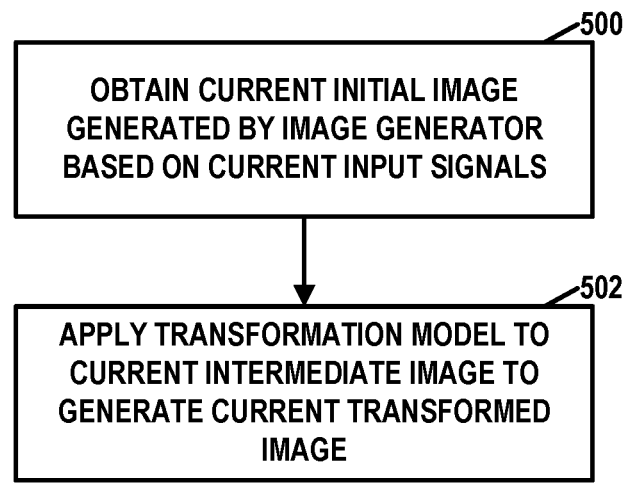
FIG. 5 is a flowchart illustrating an example process for generating a transformed image in accordance with one or more aspects of this disclosure.

FIG. 5 is a flowchart illustrating an example process for generating a transformed image in accordance with one or more aspects of this disclosure. In the example of FIG. 5, a method includes obtaining a current initial image generated by an image generator of an imaging device based on current input signals of sensors of the imaging device (500).

The imaging device may be configured to generate images based on input signals. For example, the imaging device may include devices for generating computerized tomography (CT) images, magnetic resonance imaging (MRI)

images, x-ray images, or other imaging devices. The imaging device may include one or more sensors to sense one or more parameters of ground truth data and generate input signals representing the ground truth parameters. For example, the sensors may include one or more of an electrochemical cell, a spectrometer, or an x-ray detector. The input signals may be sensor signals, for example single-point output signals or varying time-series signals. The imaging device may also include an image generator to generate an image from the input signals. In some examples, the imaging device may perform automated biochemical tests that convert electrical signals collected on two or more signal acquisition channels to a scatter plot that is visually inspected by a clinician. In some examples, the imaging device may perform medical image scanning and produce diagnostic output images that may be reviewed for unusual signatures (e.g., cancer detection). In some examples, the imaging device may generate a 3D scatter image from optical measurements using direct flow cytometry.

The method may also include applying a transformation model to the current intermediate image to generate a current transformed image (502), wherein the transformation model is a machine-learning model that has been trained to generate transformed images that more closely resemble reference images generated by a reference image generator.

The imaging device may be one of a plurality of imaging devices in a system, each in communication with a server of the system. The system may also include a reference imaging device with a reference image generator in communication with the server. Each of the plurality of imaging devices and the reference imaging device may be the same type of imaging device (e.g., a CT scanner). Ideally, each of the same type of imaging device of a plurality of imaging devices should generate the same output image when sensing the same ground truth data (i.e., given the same input signals to the image generator). However, small differences in the environment and small differences in the hardware of each imaging device may result in the image generators of individual imaging devices generating images that differ from imaging device to imaging device. Device variation may be due to a variety of factors. For example, imaging devices may contain thousands of components (e.g., electronics, mechanical, calibrators, reagents etc.) that each have specific design specifications. However, there may be component to component variation/drift that results in natural performance differences between different devices. In some examples, electrical noise may impact the performance of the imaging device. For example, a difference between device ground and earth ground in imaging devices may vary from device to device.

The sensors of each imaging device may be calibrated to the particular environment experienced by the imaging device, but may not be able to sufficiently compensate for all environmental or hardware differences. The image generator of each of imaging device may have one or more calibration parameters to further compensate for environmental and hardware differences between different imaging devices. It may be difficult and time consuming to programmatically adapt each image generator of each imaging device to produce an expected output image in response to the particular input signals received from the sensors of each imaging device in their respective environments.

A single image generator (the reference image generator of the reference imaging device) may be calibrated to as close to ideal parameters as possible. Using a plurality of simulated sensor signals applied to the reference image generator, the reference image generator may generate a plurality of corresponding reference images. Using the plurality of simulated sensor signals and the plurality of corresponding reference images, the system may generate a separate transformation model for each of the plurality of imaging devices. In some examples, each of the plurality of imaging devices may autonomously create its own transformation model using the plurality of simulated sensor signals and the plurality of corresponding reference images. Each transformation model may transform images generated by imaging devices to look more like images generated by the reference image device from the same input signals. In this way, even though each imaging device may have its own calibration parameters, the reference imaging device and imaging devices may all generate consistent, calibrated images.

In some examples, each transformation model may be implemented on a server in communication with the reference imaging device and imaging devices. For example, the reference imaging device and imaging devices may all include communication circuitry that enables the reference imaging device and imaging devices to send data to and receive data from one or more computing devices of the system (e.g., via a communications network, such as a local area network or the Internet). In some examples, each transformation model is trained on one or more cloud computing devices, for example one or more computing devices of a server. For example, an individual imaging device may receive sensor signals via sensing circuitry, generate an initial image via the imaging devices' image generator, send the initial image to one or more cloud computing devices via the imaging device's communication circuitry where the initial image is applied to a corresponding transformation model, and receive a transformed image from the transformation model via the communication circuitry.

Each transformation model may include one or more of various different types of machine learning models that perform classification, regression, clustering, anomaly detection, recommendation generation, and/or other tasks. For instance, each transformation model may be or may include one or more neural networks. A neural network may include a group of connected nodes, which also may be referred to as neurons or perceptrons. A neural network may be organized into one or more layers. Neural networks that include multiple layers may be referred to as "deep" networks. A deep network may include an input layer, an output layer, and one or more hidden layers positioned between the input layer and the output layer. The nodes of the neural network may be fully connected or non-fully connected. In some implementations, the neural networks may be CNNs. A CNN may include one or more convolutional layers that perform convolutions over input data using learned filters or kernels. CNNs may be especially useful for vision problems such as when the input data includes imagery such as still images or video.

The transformation model may receive, as input, a current initial image, for example from an image generator of an imaging device. The input to the transformation model may include image data of one or more ground truth parameters sensed by sensing circuitry of the imaging device. For example, the image data may include a 2D or 3D image. In examples where the image data is a 3D image, a computing system may generate the 3D image based on a stack of 2D images arranged along a depth dimension. The location of each pixel in the stack of 2D images may be a voxel. The image data may include multi-dimensional arrays. An output of the transformation model may include a transformed image that more closely resembles a reference image generated by a reference image generator. The output image may have the same size as the input image. In other words, for each voxel of the input image, the transformation model may output a corresponding voxel.

A transformation model may include one or more convolutional neural networks, wherein each convolutional neural network includes one or more convolutional layers, one or more normalization layers, and one or more activation layers. For example, the transformation model may include a first CNN and a second CNN. The first CNN may be referred to as an "encoder." The encoder extracts high level features in an input image. The second CNN may be referred to as a "decoder." The decoder reconstructs information at a voxel level. The method may include generating, by the first CNN, one or more feature maps based on the current input image. The method may further include generating, by the second CNN, a current transformed image based on the one or more feature maps.

Each transformation model may be trained to generate transformed images that more closely resemble reference images generated by a reference image generator. For example, a single transformation model may be trained for use by a single imaging device using a set of corresponding training data that includes a plurality of initial training images generated by the image generator of the single imaging device from a plurality of training input signals, and a plurality of reference images generated by the reference image generator of a reference imaging device from the same training input signals. The method may include generating the training data, wherein each initial training image of the plurality of initial training images includes a label indicating a corresponding reference image of the plurality of reference images. The method may further include training the transformation model based on the training data, wherein the plurality of initial training images is applied to the transformation model as input to generate transformed images that more closely resemble the plurality of reference images.

Figure 6:
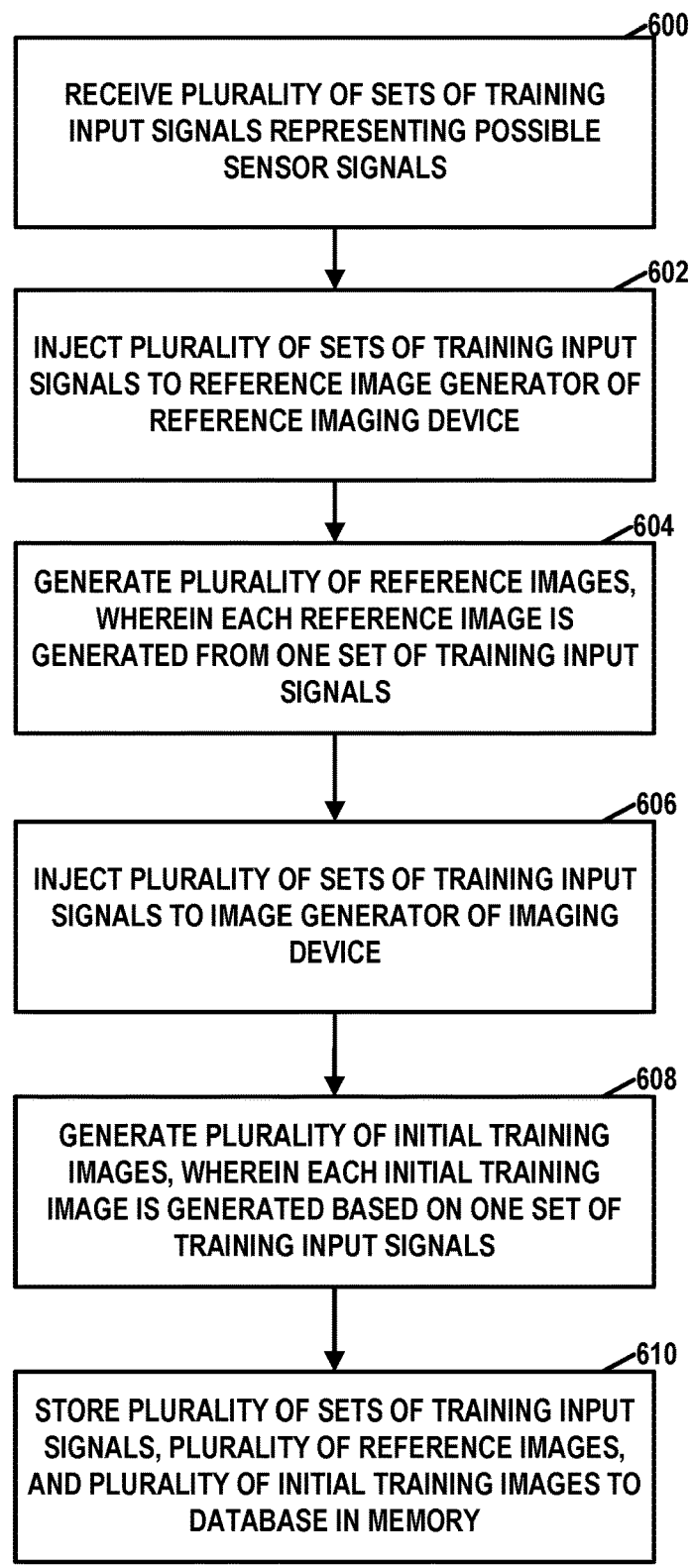
FIG. 6 is a flowchart illustrating an example process for generating a set of training data for training a transformation model of an imaging device, in accordance with one or more aspects of this disclosure.

FIG. 6 is a flowchart illustrating an example process for generating a set of training data for training a transformation model of an imaging device, in accordance with one or more aspects of this disclosure. In order to generate the training data, the method may include generating a set of common training data, as well as a plurality of sets of unique training data. The common training data may be generated by a properly calibrated reference image generator and used to train a plurality of transformation models implemented by a plurality of imaging devices. Each of the plurality of sets of unique training data may be individual for each transformation model, and may be generated by the respective imaging device which uses each transformation model.

The set of common training data may include a plurality of sets of training input signals and a plurality of reference images. For example, the method may include receiving, via a reference imaging device, a plurality of sets of training input signals representing possible sensor signals (600). For example, the training input signals may be sensor signals that include one or more of single-point output signals or varying time-series. In some examples, the training input signals are retrieved from a memory in communication with the reference device. The training input signals may have been stored there by an outside source (e.g., a programmer, technician, physician, etc.). In some examples, the plurality of sets of training input signals may be simulated signals. For example, the method may include generating the plurality of sets of training input signals via a reference signal generator of the reference imaging device. In some examples, the reference signal generator may be a device external to the reference imaging device and in communication with the reference imaging device. In some examples, the reference signal generator may be code implemented within the reference imaging device configured to generate one or more sets of simulated sensor signals. The one or more sets of simulated sensor signals may simulate real world inputs to sensing circuitry of the reference imaging device. The reference signal generator may randomly or systematically generate the plurality of sets of training input signals and store them in memory. The training input signals may represent a plurality of possible sensor signals receivable from sensors of an imaging device.

In some examples, in order to generate the plurality of reference images of the set of common training data, the method may include injecting the plurality of sets of training input signals to the reference image generator of the reference imaging device (602). During normal operation, an image generator of an imaging device may receive sensor signals directly from sensors or sensing circuitry of the imaging device. However, because the training input signals are simulated (e.g., generated programmatically rather than measured using sensors), the training input signals may be injected directly to the image generator of the imaging device and bypass the sensing circuitry.

Using the plurality of sets of training input signals, the method may include generating, via the reference image generator of the reference imaging device, the plurality of reference images, wherein each of the plurality of reference images is generated based on one set of the plurality of sets of training input signals (604). In this way, the reference image generator may generate a reference image corresponding to each set of training input signals, i.e., each reference image may be associated with a set of training signals from which that reference image was generated. The method may also include storing the plurality of sets of training input signals and the plurality of reference images in a database in memory (e.g., a server storage device). Each set of the plurality of sets of training input signals may include a label identifying the associated reference image of the plurality of reference images. In some examples, each reference image includes a label identifying the associated set of training input signals. Together, the plurality of sets of training input signals and the plurality of corresponding reference images may make up the set of common training data. Because the reference image generator has been calibrated to as close to ideal parameters as possible, the generated reference images may be as close to the ideal generated images that an imaging device can generate.

In some examples, the method may include generating the plurality of sets of unique training data using the set of common training data generated by the reference imaging device. For ease of description, the process for generating a single set of unique training data is described. For example, the method includes receiving the plurality of sets of training input signals. In some examples, an imaging device of the plurality of imaging devices (i.e., an imaging device with an image generator that has not been calibrated to as close to ideal parameters as possible) receives the plurality of sets of training input signals. In some examples, another device in communication with the imaging device receives the plurality of sets of training input signals. In some examples, a server device may retrieve the plurality of sets of training input signals from a database in memory. In some examples, the server may have received the set of common training data from a reference device computing system including a reference imaging device with a reference image generator. In some examples, the method may include regularly or sporadically receiving updated sets of common training data.

To generate the set of unique training data, the method may include injecting the plurality of sets of training input signals to the image generator of the imaging device (606). The method may further include generating, via the image generator and using the plurality of sets of training input signals, a plurality of initial training images (608). Each of the plurality of initial training images may be generated based on one of the plurality of sets of training input signals. In this way, the method may include generating an initial training image corresponding to each set of training input signals, i.e., each initial training image may be associated with a set of training signals from which that initial training image was generated.

The method may include storing the plurality of initial training images in a database in memory, as well as the plurality of reference images and the plurality of sets of training input signals (610). The plurality of initial training images may make up the unique training data. Together, the set of unique training data and the set of common training data may make up a set of training data. Each initial training image of the plurality of initial training images may include a label identifying the associated reference image of the plurality of reference images that was generated from the same set of training input signals of the plurality of sets of training input signals. In some examples, each set of training input signals includes a label identifying the associated training initial image, as well as a label identifying the associated reference image.

In some examples, the imaging device may be one of a plurality of imaging devices, all in a larger computing system (e.g., each imaging device of the plurality of imaging devices may be in communication with one or more server computing devices). The method may include training a plurality of transformation models for the plurality of imaging devices, where each imaging device uses a corresponding transformation model. For each respective imaging device of the plurality of imaging devices, the method may include generating a training dataset. Each training dataset may include the set of common training data and a respective set of unique training data. The set of common training data may include the plurality of sets of training input signals and the plurality of reference images generated by the reference image generator using the training input signals as described above. For each respective imaging device of the plurality of imaging devices, the method may include generating a plurality of initial training imaged generated by a respective image generator of the respective imaging device using the training input signals. The method may further include training each transformation model of the plurality of transformation models based on a corresponding training dataset. That is, the transformation model implemented by a respective imaging device may be trained using the set of unique training data generated by that same respective imaging device as well as the set of common training data generated by the reference imaging device.

For example, a reference imaging device may generate a set of common training data as described above, including a plurality of sets of training input signals and a plurality of reference images. A first imaging device of the plurality of imaging devices may generate a first set of unique training data as described above, including a first set of initial training images. A first transformation model may be trained using the set of common training data as well as the first set of unique training data. A second imaging device of the plurality of imaging devices may generate a second set of unique training data as described above, including a second set of initial training images. A second transformation model may be trained using the set of common training data as well as the second set of unique training data. In this way, each transformation model of the plurality of transformation models may be trained to be implemented by a respective imaging device. In some examples, each transformation model of the plurality of transformation models is trained on one or more cloud computing devices in communication with device computing system. In some examples, each transformation model of the plurality of transformation models may be implemented on a server in communication with each imaging device of a plurality of imaging devices. Each transformation model of the plurality of transformation models may correspond to a respective imaging device of the plurality of imaging devices, such that each respective imaging device may use the corresponding transformation model when generating transformed images that more closely resemble reference images generated by a reference image generator.

After a transformation model has been trained for an imaging device, the imaging device may use the transformation model to generate transformed images. For example, a method may include generating, via sensing circuitry of the imaging device, a set of current input signals based on one or more ground truth parameters sensed by the sensors of the sensing circuitry. In some examples, the set of current input signals may represent signals from an x-ray scan of a patient. The method may further include generating, via an image generator of the imaging device and using the current input signals, a current initial image. In some examples, the current initial image may be image data for an x-ray image of a patient. The method may further include applying the transformation model to the current initial image to generate a current transformed image. The current transformed image may more closely resemble a reference image generated by a properly calibrated reference image generator. In some examples, the current transformed image may be image data for an x-ray image of a patient with less blurring, and a more accurate visual depiction of the actual state of the patient's body that has been x-rayed.

Each transformation model may be used to help a corresponding imaging device to overcome small differences in the environment and circuitry of imaging device, and to generate images that resemble images generated by a properly calibrated reference image generator. In some examples, the differences in the environment and circuitry of an imaging device are large enough that they warrant further investigation. For example, large differences in the environment or circuitry of an imaging device from a properly calibrated imaging device may indicate a deeper underlying problem that needs to be fixed. For example, one or more sensors may be malfunctioning, or one or more portions of the circuitry of the imaging device may be physically damaged. In some examples, these problems may be identified by determining a difference between images generated by an image generator before being transformed, and after being transformed by a corresponding transformation model. If the difference between an initial image and the corresponding transformed image exceeds a threshold, it may indicate that there is something wrong with the imaging device or the image generator of the imaging device.

For example, the method may include determining whether a difference between a current initial image and a current transformed image exceeds a threshold. A loss function may be used to determine a difference between the current initial image and the current transformed image. The loss function may generate a loss value representing the difference between the current initial image and the current transformed image. If the loss value exceeds a threshold, the difference between the current initial image and the current transformed image may exceed the threshold. In some examples, the loss function may calculate the loss value as a sum of absolute differences. In response to the difference between the current initial image and the current transformed image exceeding a threshold, the method may include generating an alert. In some examples, the alert may indicate that the imaging device should be investigated. In some examples, the alert may indicate that sensors and/or programming of the imaging device may need to be individually calibrated (e.g., by a human operator). In some examples, the alert may indicate that the imaging device may be damaged.

Figure 7:
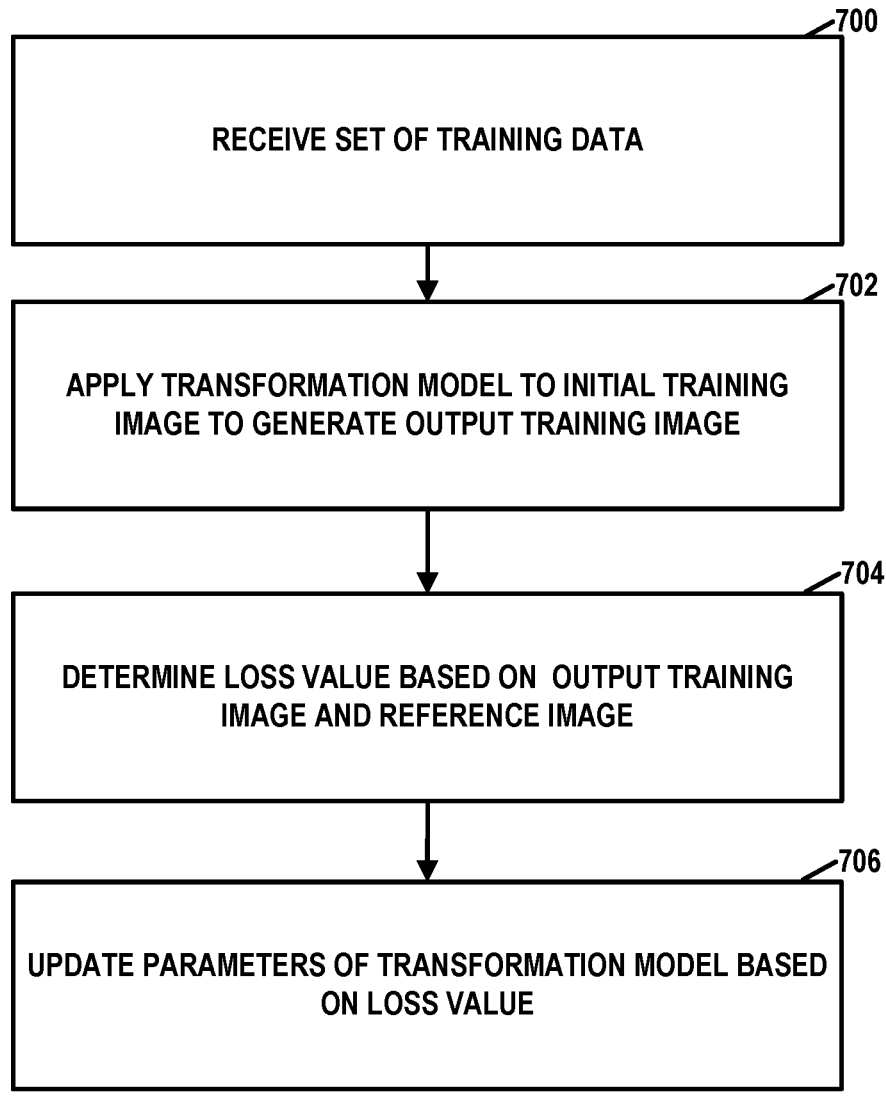
FIG. 7 is a flowchart illustrating an example process for training a transformation model of an imaging device, in accordance with one or more aspects of this disclosure.

FIG. 7 is a flowchart illustrating an example process for training a transformation model of an imaging device, in accordance with one or more aspects of this disclosure.

The method may include receiving a set of training data (700). The training data may be generated as described above with reference to FIG. 6. The set of training data may include a set of common training data and a set of unique training data. The set of common training data may include a plurality of reference images generated by a properly calibrated reference image generator of a reference imaging device based on a plurality of sets of training input signals. The set of unique training data may include a plurality of initial training images generated by an image generator of an imaging device based on the same plurality of sets of training input signals. Each initial training image may correspond to a reference image that was generated using the same set of training input signals.

The transformation model may be a machine learning model, and may be implemented in one of a variety of ways. For example, the transformation model may be a CNN. In some such examples, the CNN has a U-net or V-net architecture. The CNN may generate one or more output images. In some examples, the transformation model uses image data as input, and generates transformed image data as output. The transformation model may include a deconstruction unit and a reconstruction unit. The deconstruction unit may be trained to deconstruct an input image into one or more feature maps. The reconstruction unit may be trained to construct an output image based on the one or more feature maps, where the output image more closely resembles a reference image generated by a reference image generator.

The method may include training the transformation model using the set of training data. In some examples, the method may include generating a plurality of training datasets. For example, each of the plurality of training datasets may include a set of one or more initial training images as input, and a set of one or more reference images as output. Each of the training datasets may correspond to a different set of training input signals used to generate the set of one or more initial training images and the set of one or more reference images.

In some examples, as part of training the transformation model, the method may include performing a forward pass on the transformation model using the initial training image (i.e., initial training image data) of a training dataset as input to the transformation model. For example, the method may include applying the transformation model to the initial training image to generate an output training image (702).

The method may further include performing a process that compares the resulting output of the transformation model to the corresponding expected output data. For example, the method may include comparing the resulting output image of the transformation model to a reference image (i.e., reference image data) of the training dataset, where the reference image used in the comparison was generated from the same set of training input signals as the initial training image.

In some examples, the method includes determining a loss value based on the output training image and the reference image (704). For example, a loss function may perform the comparison by generating the loss value representing a difference between the output training image of the transformation model and the reference image. In some examples, the loss function may calculate the loss value as a sum of absolute differences (SAD). The SAD may be calculated by summing the absolute difference between each pixel in the output image compared to the reference image. In some examples, the loss function may calculate the loss value as a mean squared deviation. In some examples, the reference image may represent an image of an x-ray of a patient from a properly calibrated image generator.

The method may further include updating the parameters of the transformation model based on the loss value (706). For example, the method may include performing a back-propagation process based on the comparison to adjust parameters of the transformation model (e.g., weights of neurons of transformation model 320). In some examples, the method include repeating this process with other training datasets. Some of the training datasets may be used for validation of the transformation model.

The method may further include determining an accuracy of the transformation model. For example, the method may include determining if an example initial training image corresponding to a known reference image is properly transformed into a transformed image. In this way, the method may determine if the transformation model was able to correctly transform the initial training image. Additionally, the method may include determining an accuracy of the transformation model for a plurality of initial training images, each corresponding to a reference image. The accuracy may reflect a success rate in which the transformation model correctly transforms the initial training images. If the accuracy is above a threshold accuracy value, the transformation model may be used to transform current initial images generated by an image generator. If the accuracy is below the threshold accuracy value, the method may include re-training the transformation model based on an updated set of training data. In some examples, the threshold accuracy value in which the transformation model may be used may be greater than or equal to 90%.

The method may include determining an accuracy of the transformation model by comparing transformed images transformed by the transformation model with known reference images, where each transformed image has a corresponding reference image that was generated from the same set of input signals. For example, if the transformation model generates a first transformed image based on a first initial image generated from a first set of input signals, and the known reference image generated from the same first set of input signals differs from the first transformed image, the method may include recording that the transformation model incorrectly transformed the first initial image. The method may further include continuously monitoring an accuracy of the transformation model. The method may include determining a fraction of initial images which the transformation model correctly transforms. The fraction may represent a measured accuracy of the transformation model. The method may further include analyzing new sets of sensor signals, the new sets of sensor signals representing data that was not used to create the transformation model. The method may include requesting updated reference images to be generated from the new sets of sensor signals by the reference image generator in determining an accuracy of the transformation model. In other words, the method may include testing the accuracy of the transformation model continuously using new data. In some examples, the accuracy of the transformation model is below a threshold accuracy value (e.g., 90%), the method may include outputting an instruction to re-train the transformation model.

The method may include periodically (e.g., monthly, bi-monthly, yearly, or the like) re-training the transformation model based on an updated set of training data. The updated set of training data may include part or all of the original training data. Additionally, the updated set of training data may include sets of input sensor signals received by an imaging device during a time since the transformation model was last trained. In some examples, the transformation model may be retrained in one or more cloud devices in communication with the imaging device.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computer-implemented method comprising:
  obtaining, by one or more processors, a current initial image generated by an image generator of an imaging device based on current input signals of sensors included in sensing circuitry of the imaging device; and
  applying, by the one or more processors, a transformation model to the current initial image to generate a current transformed image, wherein:

the transformation model is a machine-learning model that has been trained with a set of training data to transform initial images to generate transformed images such that the transformed images more closely resemble reference images generated by a reference image generator of a reference imaging device than the initial images, and the set of training data includes:
- a plurality of initial training images generated by the image generator from a plurality of sets of training input signals, wherein the plurality of sets of training input signals bypass the sensing circuitry of the imaging device and are injected directly to the image generator; and
- a plurality of the reference images generated by the reference image generator from the same plurality of sets of training input signals, wherein the plurality of sets of training input signals bypass reference sensing circuitry of the reference imaging device and are injected directly to the reference image generator.

2. The computer-implemented method of claim 1, further comprising:
generating, by the one or more processors, the set of training data, wherein each initial training image of the plurality of initial training images includes a label identifying an associated reference image of the plurality of the reference images; and
training, by the one or more processors, the transformation model based on the set of training data, using the plurality of initial training images as input and the plurality of the reference images as output.

3. The computer-implemented method of claim 2, wherein generating the set of training data comprises:
receiving the plurality of sets of training input signals representing possible sensor signals;
injecting the plurality of sets of training input signals to the reference image generator of the reference imaging device;
generating the plurality of the reference images, wherein each reference image of the plurality of the reference images is generated based on one set of the plurality of sets of training input signals; and
storing the plurality of sets of training input signals and the plurality of the reference images in a database in a memory, wherein each set of the plurality of sets of training input signals includes the label identifying the associated reference image of the plurality of the reference images.

4. The computer-implemented method of claim 3, wherein generating the set of training data further comprises:
receiving the plurality of sets of training input signals from the database in the memory;
injecting the plurality of sets of training input signals to the image generator of the imaging device;
generating the plurality of initial training images, wherein each initial training image of the plurality of initial training images is generated based on one set of training input signals of the plurality of sets of training input signals; and
storing the plurality of initial training images to the database in the memory, wherein each initial training image of the plurality of initial training images includes the label identifying the associated reference image of the plurality of the reference images that was generated from the same set of training input signals of the plurality of sets of training input signals.

5. The computer-implemented method of claim 1, wherein:
the imaging device comprises a first imaging device of a plurality of imaging devices,
the transformation model comprises a first transformation model of a plurality of transformation models,
each of the plurality of transformation models is implemented by a corresponding imaging device of the plurality of imaging devices, and
the computer-implemented method further comprises, for each respective imaging device of the plurality of imaging devices:
generating, by the one or more processors, a training dataset for the respective imaging device, wherein the training dataset for the respective imaging device includes:
the plurality of initial training images generated by an image generator of the respective imaging device using the plurality of sets of training input signals, and
the plurality of the reference images generated by the reference image generator using the plurality of sets of training input signals; and
training, by the one or more processors, each of the transformation models based on the corresponding training dataset.

6. The computer-implemented method of claim 1, wherein the machine-learning model of the transformation model comprises one or more convolutional neural networks, each of the one or more convolutional neural networks including one or more convolutional layers, one or more normalization layers, and one or more activation layers.

7. The computer-implemented method of claim 6, wherein the one or more convolutional neural networks comprises a first convolutional neural network and a second convolutional neural network, the computer-implemented method further comprising:
generating, by the first convolutional neural network, one or more feature maps based on the current initial image; and
generating, by the second convolutional neural network, the current transformed image based on the one or more feature maps.

8. The computer-implemented method of claim 1, further comprising:
determining, by the one or more processors, whether a difference between the current initial image and the current transformed image exceeds a threshold; and
generating, by the one or more processors, an alert in response to determining that the difference between the current initial image and the current transformed image exceeds the threshold.

9. The computer-implemented method of claim 1, wherein the transformation model is implemented on a server in communication with the imaging device.

10. The computer-implemented method of claim 1, wherein the transformation model is trained on one or more cloud computing devices.

11. The computer-implemented method of claim 1, wherein the sensors one or more of an electrochemical cell, a spectrometer, or an x-ray detector.

12. The computer-implemented method of claim 1, wherein the current input signals comprise one or more of a single-point output signal or a varying time-series.

13. A computing system comprising:
an imaging device;
at least one memory; and
one or more processors in communication with the at least one memory, the one or more processors configured to:
obtain a current initial image generated by an image generator of the imaging device based on current input signals of sensors included in sensing circuitry of the imaging device; and
apply a transformation model to the current initial image to generate a current transformed image, wherein:
the transformation model is a machine-learning model that has been trained with a set of training data to transform initial images to generate transformed images such that the transformed images more closely resemble reference images generated by a reference image generator of a reference imaging device than the initial images; and
the set of training data includes:
a plurality of initial training images generated by the image generator from a plurality of sets of training input signals, wherein the plurality of sets of training input signals bypass the sensing circuitry of the imaging device and are injected directly to the image generator; and
a plurality of the reference images generated by the reference image generator from the same plurality of sets of training input signals, wherein the plurality of sets of training input signals bypass reference sensing circuitry of the reference imaging device and are injected directly to the reference image generator.

14. The computing system of claim 13, wherein:
the one or more processors are further configured to:
generate the set of training data, wherein each initial training image of the plurality of initial training images includes a label identifying an associated reference image of the plurality of the reference images; and
train the transformation model based on the set of training data, using the plurality of initial training images as input and the plurality of the reference images as output.

15. The computing system of claim 14, wherein to generate the set of training data, the one or more processors are configured to:
receive the plurality of sets of training input signals representing possible sensor signals;
inject the plurality of sets of training input signals to the reference image generator of the reference imaging device;
generate the plurality of the reference images, wherein each reference image of the plurality of the reference images is generated based on one set of the plurality of sets of training input signals; and
store the plurality of sets of training input signals and the plurality of the reference images in a database in a memory, wherein each set of the plurality of sets of training input signals includes the label identifying the associated reference image of the plurality of the reference images.

16. The computing system of claim 15, wherein to generate the set of training data, the one or more processors are further configured to:
receive the plurality of sets of training input signals from the database in the memory;
inject the plurality of sets of training input signals to the image generator of the imaging device;
generate the plurality of initial training images, wherein each initial training image of the plurality of initial training images is generated based on one set of training input signals of the plurality of sets of training input signals; and
store the plurality of initial training images to the database in the memory, wherein each initial training image of the plurality of initial training images includes the label identifying the associated reference image of the plurality of the reference images that was generated from the same set of training input signals of the plurality of sets of training input signals.

17. The computing system of claim 13, further comprising a plurality of imaging devices, wherein:
the imaging device comprises a first imaging device of the plurality of imaging devices,
the transformation model comprises a first transformation model of a plurality of transformation models,
each of the plurality of transformation models is implemented by a corresponding imaging device of the plurality of imaging devices, and
for each respective imaging device of the plurality of imaging devices, the one or more processors are further configured to:
generate a training dataset for the respective imaging device, wherein the training dataset for the respective imaging device includes:
the plurality of initial training images generated by an image generator of the respective imaging device using the plurality of sets of training input signals, and
the plurality of the reference images generated by the reference image generator using the plurality of sets of training input signals; and
train each of the transformation models based on the corresponding training dataset.

18. The computing system of claim 13, wherein:
the machine learning model of the transformation model comprises at least a first convolutional neural network and a second convolutional neural network,
each convolutional neural network of the machine-learning model includes one or more convolutional layers, one or more normalization layers, and one or more activation layers; and
the one or more processors are further configured to:
generate, by the first convolutional neural network, one or more feature maps based on the current initial image; and
generate, by the second convolutional neural network, the current transformed image based on the one or more feature maps.

19. The computing system of claim 13, wherein the one or more processors are further configured to:
determine whether a difference between the current initial image and the current transformed image exceeds a threshold; and
generate an alert in response to determining that the difference between the current initial image and the current transformed image exceeds the threshold.

20. A computer-implemented method comprising:
generating, by one or more processors, a plurality of sets of training input signals representing possible sensor signals from sensors of a reference imaging device;
generating, by the one or more processors, a plurality of reference images by injecting the plurality of sets of training input signals to a reference image generator of the reference imaging device;

generating, by the one or more processors, a plurality of initial training images by injecting the plurality of sets of training input signals to an image generator of an imaging device;

storing, by the one or more processors, the plurality of initial training images to a database in a memory, wherein:

each initial training image of the plurality of initial training images includes a label identifying an associated reference image of the plurality of reference images that was generated from the same set of training input signals of the plurality of sets of training input signals; and a set of training data includes the plurality of initial training images and the plurality of reference images; and training, by the one or more processors, a machine-learning model based on the set of training data to enable the machine-learning model to transform initial images to generate transformed images such that the transformed images more closely resemble the plurality of reference images.

* * * * *